United States Patent [19]

Nölken

[11] 4,290,930

[45] Sep. 22, 1981

[54] AQUEOUS VINYL PLASTICS DISPERSION CONTAINING WATER SOLUBLE SALT OF POLYBASIC PHOSPHONIC ACID DERIVATIVE

[75] Inventor: Ernst Nölken, Frankfurt am Main, Fed. Rep. of Germany

[73] Assignee: Hoechst Aktiengesellschaft, Frankfurt am Main, Fed. Rep. of Germany

[21] Appl. No.: 18,732

[22] Filed: Mar. 8, 1979

[30] Foreign Application Priority Data

Mar. 10, 1978 [DE] Fed. Rep. of Germany ....... 2810348

[51] Int. Cl.$^3$ ................................................ C08K 5/50
[52] U.S. Cl. ....................... 260/29.6 MP; 260/17 R; 428/500; 526/193; 526/200; 526/201
[58] Field of Search ............. 260/29.6 MP, 29.6 WA, 260/29.6 RW, 17 R

[56] References Cited

U.S. PATENT DOCUMENTS

| | | | |
|---|---|---|---|
| 3,341,340 | 9/1967 | Sawyer et al. | 106/72 |
| 3,484,395 | 12/1969 | Guziak | 260/8 |
| 3,784,511 | 1/1974 | Kirby | 260/29.6 MP |

FOREIGN PATENT DOCUMENTS 745617 8/1970 Belgium ...................... 260/29.6 MP
1255174 12/1971 United Kingdom .

OTHER PUBLICATIONS

Encyclopedia of Polymer Science and Technology, vol. 13, (1970), p. 570.

*Primary Examiner*—Harold D. Anderson
*Attorney, Agent, or Firm*—Curtis, Morris & Safford

[57] ABSTRACT

In the manufacture of plastics dispersions on the basis of vinyl polymers water-soluble salts of polybasic phosphonic acid derivatives, especially alkane-phosphonic acids and phosphonomethyl amines are used as dispersing auxiliaries. The dispersions obtained are suitable as coating agents and for impregnating, coating or glueing solid materials.

8 Claims, No Drawings

AQUEOUS VINYL PLASTICS DISPERSION CONTAINING WATER SOLUBLE SALT OF POLYBASIC PHOSPHONIC ACID DERIVATIVE

Vinyl polymers can be produced by emulsion polymerization in the presence of surface-active compounds. However, the latices obtained are generally unstable if they do not contain further stabilizers. By the use of larger amounts of anionically active emulsifiers the stability of the latex to mechanical stress, such as pumping and stirring, can be improved but simultaneously the thermostability of the polymer or the resistance to water of the films made from the latex is affected. The results are similar with the additional use of protective colloids or copolymers of unsaturated acids.

It is the object of the present invention to provide an aqueous plastics dispersion with low viscosity and high pigment binding capacity which is suitable as binder, for example for spread coating pastes for paper.

The invention relates to an aqueous plastics dispersion on the basis of vinyl polymers and is characterized in that the dispersion contains a water-soluble salt of a polybasic phosphonic acid derivative having 2, 3 or 4 phosphorus atoms.

Further, the invention relates to a process for the manufacture of an aqueous plastics dispersion by polymerizing at least one vinyl monomer in aqueous dispersion in the presence of an emulsifier under known conditions, which comprises carrying out the polymerization in the presence of a water-soluble salt of a polybasic phosphonic acid derivative having 2, 3 or 4 phosphorus atoms.

Suitable phosphonic acid derivatives are diphosphono-alkanes preferably having from 1 to 8 and more preferably from 1 to 4 carbon atoms, and phosphono-methyl amines having 1 or 2 nitrogen atoms.

Preferred compounds are salts of alkane-phosphonic acids of the formula I

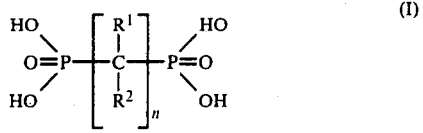

in which $R^1$ is a hydrogen atom or an alkyl group having from 1 to 8 carbon atoms, $R_2$ is a hydrogen atom, hydroxy group or an alkyl group having from 1 to 8 carbon atoms and n is an integer from 1 to 10, preferably 1, 2, or 3. Methyl and ethyl groups are preferred as alkyl groups. Especially suitable compounds of formula I are, for example, methanediphosphonic acid, ethane-1,1-diphosphonic acid, ethane-1,2-diphosphonic acid, n-propane-1,3-diphosphonic acid, n-butane-1,4-diphosphonic acid, n-propane-1,1-diphosphonic acid, n-propane-2,2-diphosphonic acid, 1-hydroxyethane-1,1-diphosphonic acid and 1-hydroxy-n-propane-2,2-diphosphonic acid.

Salts of phosphono-methyl amines of formula II are also suitable

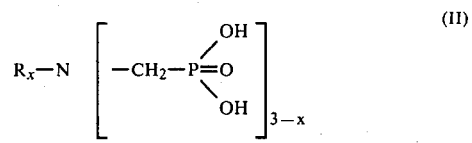

in which R is an alkyl group having from 1 to 6, preferably 1, 2, or 3 carbon atoms and x is zero or 1. Methyl and ethyl groups are preferred as alkyl groups. Especially suitable compounds of formula II are, for example, tris (phosphonomethyl)-amine, N-methyl-N,N-bis(-phosphonomethyl)-amine, N-ethyl-N,N-bis(phosphonomethyl)-amine, N-propyl-N,N-bis(phosphonomethyl)-amine, N-butyl-N,N-bis(phosphonomethyl)-amine and N-hexyl-N,N,-bis(phosphonomethyl)-amine.

Further suitable compounds are the salts of phosphonomethyl-amines of the formula III

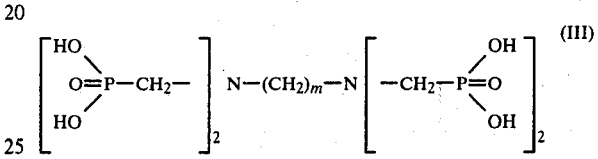

in which m is an integer from 2 to 14, preferably from 2 to 6. Especially suitable compounds of formula III are, for example N,N,N',N'-tetrakis(phosphonomethyl)-ethylene diamine, N,N,N',N'-tetrakis(phosphonomethyl)-trimethylene diamine and the corresponding derivatives of tetramethylene diamine and hexamethylene diamine.

The salts of phosphonic acid derivatives to be used according to the invention as dispersing auxiliaries must be soluble in water. Especially suitable are alkali metal salts, for example the sodium and potassium salts, and ammonium salts, i.e. salts of ammonia, and salts of primary, secondary or tertiary aliphatic amines, preferably mono-, di- and trialkyl amines the alkyl radicals of which are either identical or different and each contain from 1 to 4 carbon atoms and which may be substituted by a hydroxy group. There are mentioned by way of example methyl amine, ethyl amine, propyl amine, dimethyl amine, diethyl amine, dipropyl amine, trimethyl amine, triethyl amine, tripropyl amine, ethanol amine, diethanol amine, triethanol amine, N,N-dimethylaminoethanol and 2-amino-2-methyl-propanol-(1). Cyclic amines such as piperidine, morpholine and piperazine and linear polyamines such as ethylene diamine, diethylene triamine and triethylene tetramine can also be used.

Diphosphonomethyl-alkanes of formula I are prepared by reacting dialkyl phosphites with dihalogenoalkanes, while diphosphonomethyl-hydroxyalkane are obtained by reacting phosphorous acid with the corresponding carboxylic acid anhydrides, preferably acetic anhydride.

Phosphonomethyl amines of formulae II and III are prepared by reacting phosphorous acid with formaldehyde and ammonia or ammonium chloride or the corresponding amines or diamines in the presence of hydrogen chloride at a temperature of from 50° to 120° C., preferably 80° to 100° C.

The essential feature of the process of the invention is that the polymerization of the vinyl monomer(s) is carried out in the presence of an emulsifier and at least one salt, acting as dispersing auxiliary, of a phosphonic acid derivative having 2, 3, or 4 phosphorus atoms. The salts can be added to the polymerization mixture per se or they can be formed in situ by neutralization of a phosphonic acid derivative contained in the mixture. The neutralization need not be complete so that acid salts can also be formed. As neutralizing agents, compounds having a basic reaction are used, preferably alkali metal hydroxides, alkali metal carbonates, ammonia and ammonium carbonate as well as the aforesaid primary, secondary or tertiary aliphatic amines. The neutralizing agents are added in an amount of from 0.1 to 1.2 mols, preferably 0.3 to 0.9 mol (calculated on 1 mol of the phosphonic acid derivative). The neutralization is preferably carried out in aqueous solution generally having a pH of from 2 to 10, preferably 4 to 8.

The phosphonic acid salt is added in an amount of from 0.005 to 5% by weight, preferably 0.01 to 2% by weight (calculated on the total amount of vinyl monomer(s)). It can be added to the polymerization mixture prior to the beginning of polymerization, or preferably a portion is added prior to the beginning of polymerization with the remaining portion being added in dosed quantities during the course of polymerization. According to a special embodiment of the process of the invention, an aqueous solution of 5 to 30% by weight of the salt is placed in the reaction vessel prior to the beginning of polymerization, then 30 to 55% by weight of the salt is metered in together with the vinyl monomer(s) and finally 15 to 65% by weight of the salt is added in dosed quantities to the polymerization mixture after termination of the monomer addition. The salts can be used either individually or in admixture with one another.

The phosphonic acid salt is used in combination with known, preferably anionic, surface-active substances such as alkyl sulfates, alkane sulfonates, sulfosuccinic acid esters and sodium salts of oxethylated or sulfonated alcohols or alkyl phenols. The surface-active substance is used in an amount of from 0.1 to 3% by weight, preferably 0.5 to 2% by weight (calculated on the total amount of vinyl monomer(s)). The proportion by weight of surface-active substance to phosphonic acid salt is in the range of from 10:1 to 10:50, preferably 3:1 to 1:1.

Within the scope of the invention all vinyl monomers, i.e. olefinically unsaturated compounds, being polymerizable in aqueous dispersion can be used, above all compounds of the formula V

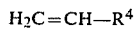

in which $R^4$ is a hydrogen atom, an alkyl group having from 1 to 4 carbon atoms, an alkoxy group having from 1 to 4 carbon atoms, an alkylcarboxyl group having from 2 to 12, preferably from 2 to 10 carbon atoms, a nitrile group, a halogen atom, preferably a chlorine atom, a phenyl group, or an alkoxycarbonyl group having from 2 to 12, preferably from 2 to 9 carbon atoms. Instead of one single vinyl monomer also a mixture of several vinyl monomers can be used.

Suitable vinyl monomers are especially olefins, for example ethylene and isobutylene; vinyl ethers, for example vinylmethyl ether, vinylethyl ether and vinyl-n-butyl ether; vinyl esters of aliphatic monocarboxylic acids, for example vinyl acetate, vinyl propionate, vinyl butyrate, vinyl laurate and vinyl decanates; vinylidene chloride; acrylonitrile; vinyl chloride; styrene; acrylic acid esters of monohydric alkanols, for example methyl acrylate, ethyl acrylate, butyl acrylate and 2-ethylhexyl acrylate; methacrylic acid esters of monohydric alkanols, for example methyl methacrylate, ethyl methacrylate, butyl methacrylate and 2-ethylhexyl methacrylate. Best results are obtained with a vinyl ester, optionally in admixture with one or two further vinyl monomers.

The polymerization of the respective vinyl monomer(s) is carried out under known conditions in the presence of a radical forming initiator, preferably a peroxy compound or an aliphatic azo compound. Suitable initiators are, for example, the alkali metal and ammonium salts of peroxydisulfuric acid or peroxydiphosphoric acid and azo-$\gamma,\gamma'$bis(4-cyanovaleric acid). The initiator is used in an amount of from 0.05 to 1% by weight, preferably 0.1 to 0.4% by weight (calculated on the total amount of vinyl monomer(s)). The initiator may be used together with a reducing agent, for example an alkali metal sulfite, alkali metal thiosulfate, alkali metal dithionite, formaldehyde sodium sulfoxylate or a heavy metal salt. The initiator can be placed in the reaction vessel prior to the beginning of polymerization or added to the reaction mixture in dosed quantities during polymerization. The conditions are the same with the reducing agent. The polymerization is carried out at a temperature of from 25° to 90° C., preferably 40° to 75° C., the polymerization time being in the range of from 2 to 10 hours, preferably 3 to 8 hours, depending on the type and amount of vinyl monomer(s).

The plastics dispersion according to the invention may contain further additives having a favorable effect on the viscosity, the wetting and dispersing properties, the stability to freezing and to electrolytes and the foaming behavior. In general, at most 10% by weight, preferably 1 to 5% by weight (calculated on the plastics dispersion) of said additives are used.

Suitable thickening agents are cellulose derivatives, for example methyl cellulose, hydroxyethyl cellulose, hydroxypropyl cellulose, carboxymethyl cellulose; poly(vinyl alcohol), poly(vinylpyrrolidone), poly(ethylene glycol), salts of poly-(acrylic acid) and salts of acrylic acid/acrylamide copolymers.

As wetting and dispersing agents sodium polyphosphate, salts of low molecular weight poly(acrylic acid), salts of poly(ethylene-sulfonic acid), salts of poly(vinyl-phosphonic acid), salts of poly(maleic acid) and salts of copolymers of maleic acid with ethylene, 1-olefins having from 3 to 18 carbon atoms, vinylalkyl ethers with 3 to 14 carbon atoms and/or styrene.

To improve the stability to freezing and to electrolytes monomeric and polymeric 1,2-diols, for example glycol, propylene glycol-(1,2) and butylene glycol-(1,2), or oxethylated compounds, for example reaction products of ethylene oxide with long chain alkanols, amines, carboxylic acids, carboxylic acid amides, alkyl phenols, poly(propylene glycol) or poly(butylene glycol) can be added to the dispersion.

The minimum film forming temperature (white point) of the plastics dispersion can be lowered by adding solvents, for example ethyl glycol, butyl glycol, ethyl glycol acetate, ethyl diglycol acetate, butyl glycol acetate, butyl diglycol acetate, gasoline or alkylated aromatic compounds. Suitable antifoaming agents are, for example, poly(propylene glycol) and polysiloxanes.

The plastics dispersion according to the invention has a solids content of 40 to 65% by weight, preferably 45 to 55% by weight. The minimum film forming temperature is in the range of from $-10°$ to 30° C., preferably 0° to 20° C., and the viscosity is from 10 to 1,000 mPa.s, preferably 30 to 400 mPa.s (measured by the Epprecht method). The dispersion has a pH of from 3.5 to 9.0, preferably 4.5 to 8.0, and the dispersed polymer particles have an average diameter of from 0.05 to 5.0 μm, preferably 0.08 to 2.0 μm. The reduced specific viscosity $\eta_{spec}/c$ of the polymer ranges from 1 to 30 dl/g, preferably 2 to 20 dl/g (measured in dimethyl formamide at 20° C.). The dispersion is used as coating material and for impregnating, coating and glueing natural or synthetic materials such as wood, paper, metals, textile materials and plastics materials. It is especially suitable as binder for pigments and for fillers in dispersion paints and in spread coating pastes for paper. A special advantage of the plastics dispersion resides in the fact that it is not colored by heavy metal ions, particularly iron ions. It is also distinguished by a good storing stability.

The following examples illustrate the invention, the parts and percentages being by weight unless otherwise stated.

The abbreviations used in the examples have the following meaning:
VA = vinyl acetate
VC = vinyl chloride
ET = ethylene
MMOE = maleic acid mono-(2-ethylhexyl) ester
NaLS = sodium lauryl sulfate
NaDBS = sodium dodecyl sulfate
PPG = polypropylene glycol
HEDP = 1-hydroxyethane 1,1-diphosphonic acid
TPMA = tris(phosphonomethyl)-amine
TPMEA = N,N,N',N'-tetrakis(phosphonomethyl)-ethylene diamine
TPMHA = N,N,N',N'-tetrakis(phosphonomethyl)-hexamethylene diamine
MDP = methane-diphosphonic acid
RSV reduced specific viscosity $\eta_{spec}/c$
MFT = minimum film forming temperature.

EXAMPLE 1

10,000 Parts of water free from electrolytes are drawn by vacuum into an autoclave provided with stirring means and the water is washed with nitrogen while stirring. 20 bar of ethylene are then pressed in, and the temperature in the autoclave is adjusted to 45° C. Next, 25% of a solution I of 19 parts of sodium sulfite, 180 parts of sodium lauryl sulfate and 60 parts of tris(phosphonomethyl)-amine in 2,000 parts of water, which solution has been adjusted to a pH of 6.8 with concentrated aqueous ammonia, is metered in over a period of 5 minutes. 10% of a mixture of 8,890 parts of vinyl acetate and 3,810 parts of vinyl chloride are added, the ethylene pressure is raised to 45 bar and, after addition of a solution of 45 parts of ammonium persulfate in 400 parts of water, the internal temperature is adjusted to 60° C. During the course of 6 hours the remaining 75% of solution I and the remaining 90% of the VA/VC mixture are metered in, while the ethylene pressure is maintained at 45 bar by adding ethylene. Then the addition of ethylene is discontinued, a solution of 15 parts of ammonium persulfate in 600 parts of water is metered in and the content of the autoclave is heated to 85° C. During heating and during the first 30 minutes at 85° C. a solution II of 120 parts of sodium lauryl sulfate and 40 parts of tris(phosphonomethyl)-amine in 1,170 parts of water, adjusted to pH 6.8 by adding concentrated aqueous ammonia solution, is metered in, whereupon the reaction mixture is stirred for another 30 minutes at 85° C. and finally cooled to 30° C. while stirring.

A fine-particle, low viscous ET/VA/VC terpolymer dispersion stable to shearing and having a solids content of 51.1%, a minimum film forming temperature of 7° C., a viscosity of 40 mPa.s and a pH of 5.0 is obtained. The polymer particles have an average diameter of 0.169 μm. The terpolymer has an ethylene content of 12.3% and an RSV value of 3.42 dl/g. To test the stability to shearing the dispersion is stirred for 2 minutes at a speed of 5,000 rpm. No coagulum is formed and the average particle diameter remains unaltered. When 4% of a 5% ferric chloride solution is added to a sample of the dispersion, the iron solution is decolorized. After drying at room temperature, the dispersion forms a limpid film which becomes opaque after 12 minutes only when wetted with water.

EXAMPLE 2 (example of application)

A pigment paste is prepared from the following substances by blending and stirring for 10 minutes at 3,000 rpm:

| | | |
|---|---|---|
| water | 320 | parts |
| 10% aqueous sodium tripolyphosphate solution | 18 | parts |
| polysiloxane antifoaming agent | 1.4 | parts |
| 25% aqueous ammonia solution | 1.4 | parts |
| titanium dioxide | 70 | parts |
| calcium carbonate (mean particle diameter 1–8 μm) | 310 | parts |
| calcium carbonate (mean particle diameter 0.5–0.6 μm) | 275 | parts |
| methylcellulose (Hoeppler viscosity of a 2% aqueous solution 30 Pa·s) | 3 | parts |
| methyl cellulose (Hoeppler viscosity of a 2% aqueous solution 0.2 Pa·s) | 2 | parts |

190 parts of the pigment paste obtained are homogeneously mixed with 19.55 parts of the dispersion of Example 1. Next, 4.2 parts of a hydrocarbon mixture on the basis of alkyl-benzenes (alkyl-benzenes having at least 10 carbon atoms, boiling temperature 161° to 182° C.) are incorporated while stirring. The resulting dispersion paint contains 4.7% of the ET/VA/VC terpolymer.

Black PVC foil is painted with the dispersion paint in a layer thickness of 200 μm (wet) and the coatings are dried at 23° C. at a relative humidity of 50%. After 1 and 3 days, respectively, the dried paints are examined as to their wet abrasion resistance (cf. DIN 53 778). The coatings dried for 1 day are frayed after 1,116 double strokes of the brush and the coatings dried for 3 days are frayed after 1,602 double strokes of the brush.

EXAMPLES 3 TO 10

Examples 1 and 2 are repeated with the modifications indicated in the following Table 1.

The data measured and test results are also indicated in Table 1.

In Example 5 solutions I and II have a pH of 5.0 instead of 6.8, and in Example 6 solution I does not contain sodium sulfite.

The indicated amounts are parts by weight unless otherwise stated.

TABLE 1

| Example | 3 | 4 | 5 | 6 | 7 | 8 | 9 | 10 |
|---|---|---|---|---|---|---|---|---|
| VA amount | 7,620 | 10,160 | 10,160 | 10,160 | 10,160 | 10,160 | 8,890 | 8,890 |
| VC amount | 5,080 | 2,540 | 2,540 | 2,540 | 2,540 | 2,540 | 3,810 | 3,810 |
| polymerization temperature (°C.) | 60 | 60 | 53 | 53 | 60 | 60 | 60 | 60 |
| emulsifier | NaLS | NaLS | NaLS | NaLS | NaLS | NaLS | NaDBS | NaLS |
| amount in solution I | 90 | 120 | 120 | 120 | 120 | 120 | 120 | 120 |
| amount in solution II | 60 | 80 | 80 | 80 | 80 | 80 | 80 | 80 |
| phosphonic acid derivative | HEDP | TPMA | TPMA | TPMA | TPMEA | TPMHA | TPMA | TPMA |
| amount in solution I | 30 | 60 | 60 | 30 | 60 | 60 | 60 | 60 |
| amount in solution II | 20 | 40 | 40 | 20 | 40 | 40 | 40 | 40 |
| proportion of emulsifier/phosphonic acid derivative | 3:1 | 2:1 | 2:1 | 4:1 | 2:1 | 2:1 | 2:1 | 2:1 |
| solids content (%) | 50.7 | 51.8 | 51.1 | 51.4 | 51.1 | 51.4 | 48.2 | 49.7 |
| RSV (dl/g) | 1.17 | 1.77 | 4.1 | 3.7 | 2.12 | — | 2.82 | 2.52 |
| MFT (°C.) | 12 | 1 | 4 | 4.5 | 1.5 | — | 3 | 3 |
| mean particle diameter (μm) | 0.270 | 0.212 | 0.235 | 0.173 | 0.192 | 0.256 | 0.176 | 0.187 |
| double strokes of brush after | | | | | | | | |
| 1 day | 1,120 | 3,600 | >3,000 | 2,860 | 2,030 | 1,866 | 1,460 | 2,490 |
| 3 days | 1,920 | >5,000 | 2,724 | 2,100 | 4,785 | 1,751 | 1,470 | 2,330 |

EXAMPLE 11

A vessel provided with stirrer, internal thermometer, reflux condenser, gas inlet and 2 dropping funnels is charged with 500 parts of water free from electrolytes and washed with nitrogen. 7% of a solution I of 7.5 parts of NaLS and 2.5 parts of TPMA in 200 parts of water, adjusted to pH 6.8 with 20% sodium hydroxide, and a solution of 0.9 part of ammonium persulfate in 20 parts of water are then added to the water. The temperature of the mixture is raised to 60° C., and a further 53% of solution I and a mixture of 600 parts of vinyl acetate and 150 parts of a commercial mixture of vinyl esters of tertiary, saturated aliphatic carboxylic acids having 10 carbon atoms is metered in during the course of 3 hours. Next, a solution of 0.45 part of ammonium persulfate in 30 parts of water is added and the internal temperature is raised to 75° C. During heating the residual 40% of solution I are metered in and the reaction mixture is stirred for another 30 minutes at 75° C., whereupon it is cooled to room temperature while stirring.

A fine-particle, low viscous copolymer dispersion is obtained having a solids content of 50.4%, a minimum film forming temperature of 16° C., a viscosity of 30 mPa.s and a pH of 5.2. The polymer particles have an average diameter of 0.215 μm. The copolymer has an RSV value of 4.38 dl/g (measured in dimethyl formamide at 20° C.). When 4% of a 5% ferric chloride solution are added to a sample of the dispersion, the iron salt solution is decolorized.

EXAMPLES 12 TO 22

Example 11 is repeated with the modifications indicated in Tables 2 and 3. In Examples 18 and 19 concentrated ammonia solution and triethanol amine, respectively, are used as neutralizing agent instead of sodium hydroxide solution. The measured data and test results are also indicated in Tables 2 and 3.

TABLE 2

| Example | 12 | 13 | 14 | 15 | 16 | 17 |
|---|---|---|---|---|---|---|
| emulsifier | NaLS | NaLS | NaLS | NaLS | NaDBS | NaDBS |
| amount | 15 | 10 | 15 | 15 | 7.5 | 15 |
| phosphonic acid derivative | TPMA | TPMA | MDP | HEDP | TPMA | TPMA |
| amount | 5 | 10 | 5 | 5 | 7.5 | 5 |
| proportion of emulsifier/phosphonic acid derivative | 3:1 | 1:1 | 3:1 | 3:1 | 3:1 | 3:1 |
| solids content (%) | 51.1 | 52.0 | 51.8 | 52.0 | 50.9 | 51.9 |
| RSV (dl/g) | 3.98 | 4.98 | 3.19 | 0.6 | 10.5 | 2.84 |
| MFT (°C.) | 16 | 16 | 16 | 13 | — | — |
| mean particle diameter (μm) | 0.207 | 0.500 | 0.248 | 0.191 | — | — |

TABLE 3

| Example | 18 | 19 | 20 | 21 | 22 |
|---|---|---|---|---|---|
| emulsifier | NaLS | NaLS | NaLS | NaLS | NaLS |
| amount | 15 | 15 | 15 | 15 | 15 |
| phosphonic acid derivative | TPMA | TPMA | TPMA | TPMA | TPMA |
| amount | 5 | 5 | 2.5 | 5 | 7.5 |
| proportion of emulsifier/phosphonic acid derivative | 3:1 | 3:1 | 6:1 | 3:1 | 3:1 |
| solids content (%) | 51.8 | 51.9 | 50.0 | 52.0 | 52.3 |
| RSV (dl/g) | — | — | 3.1 | 4.3 | 3.68 |

EXAMPLES 23 AND 24

The dispersion is prepared as described in Example 11 with the exception that 750 parts of vinyl acetate are used as sole monomer. The other modifications and the measured data and test results are indicated in Table 4.

TABLE 4

| Example | 23 | 24 |
|---|---|---|
| emulsifier | NaLS | NaLS + PPG |
| amount | 8 | 8 + 9 |
| phosphonic acid derivative | TPMA | TPMA |
| amount | 2 | 2 |
| proportion of emulsifier to phosphonic acid derivative | 4:1 | 4:1 |
| neutralizer | ammonia solution | triethanol amine |
| solids content (%) | 50.6 | 51.6 |

EXAMPLE 25

Example 11 is repeated with a monomer mixture of 375 parts of butyl acrylate and 375 parts of methyl methacrylate. Solution I consists of 15 parts of NaLS and 5 parts of TPMA. A fine-particle, low viscous copolymer dispersion having a solids content of 51.4%, a minimum film forming temperature of 9° C., a viscosity of 50 mPa.s and a pH of 6.6 is obtained. The particles have an average diameter of 0.125 μm. When 4% of a 5% ferric chloride solution are added to a sample of the dispersion, the iron salt solution is decolorized.

COMPARATIVE EXAMPLES A TO D

Examples 1 and 2 are repeated using a further comonomer instead of the phosphonic acid derivative. The other modifications and the measured data and test results are indicated in the following Table 5. The dispersions obtained do not decolorize ferric chloride solution.

TABLE 5

| Example | A | B | C | D |
|---|---|---|---|---|
| emulsifier | NaLS | NaLS | NaLS | NaLS |
| amount in solution I | 120 | 120 | 120 | 120 |
| amount in solution II | 80 | 80 | 80 | 80 |
| comonomer | crotonic acid | MMOE | acrylic acid | acrylic acid/acryl amide |
| amount in solution I | 60 | 180 | 60 | 30/30 |
| amount in solution II | 40 | 120 | 40 | 20/20 |
| solids content (%) | 45.2 | 48.8 | 50.1 | 50.5 |
| mean particle diameter (μm) | 0.169 | 0.190 | 0.161 | 0.164 |
| double strokes of the brush after 1 day | 445 | 641 | 880 | 1078 |
| 3 days | 585 | 696 | 1096 | 1180 |

What is claimed is:

1. An aqueous dispersion of vinyl polymer plastic containing 0.005 to 5% by weight, calculated on the total amount of vinyl monomer(s), of a water-soluble salt of a polybasic phosphonic acid derivative having two to four phosphorus atoms wherein said dispersion contains polymer particles with an average diameter of 0.05 to 5.0 μm.

2. The dispersion of claim 1 wherein the average diameter of the polymer particles is 0.08 to 2.0 μm.

3. The dispersion of claim 1 having a pH of 3.5 to 9.0.

4. The dispersion of claim 1 wherein the water-soluble salt is either an ammonium or an alkali metal salt.

5. The dispersion of claim 1 wherein the phosphonic acid derivative is either a diphosphono-alkane having 1 to 8 carbon atoms or a phosphonomethyl amine having 1 or 2 nitrogen atoms.

6. The dispersion of claim 5 wherein the diphosphonoalkane is a compound having the general formula:

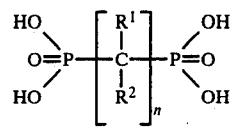

in which $R^1$ is a hydrogen atom or an alkyl group having from 1 to 8 carbon atoms, $R^2$ is a hydrogen atom, a hydroxy group or an alkyl group having from 1 to 8 carbon atoms and n is an integer from 1 to 10.

7. The dispersion of claim 5 wherein the phosphonomethyl amine is a compound having the general formula:

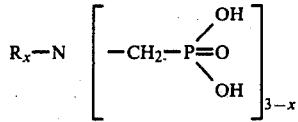

in which R is an alkyl group having from 1 to 12 carbon atoms and x is zero or 1.

8. The dispersion of claim 6 wherein the phosphonomethyl amine is a compound having the general formula:

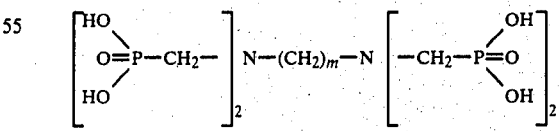

in which m is an integer from 2 to 14.

* * * * *